US012682566B2

(12) United States Patent
Shu et al.

(10) Patent No.: US 12,682,566 B2
(45) Date of Patent: Jul. 14, 2026

(54) ENHANCING ELEVATION MODELS WITH LANDCOVER FEATURE DATA

(71) Applicant: ECOPIA TECH CORPORATION, Toronto (CA)

(72) Inventors: Yuanming Shu, Toronto (CA); Shuo Tan, Campbell, CA (US); Dawei Zai, Toronto (CA); Ruijie Deng, Toronto (CA); Zihao Chen, Toronto (CA); Andi Dai, Toronto (CA)

(73) Assignee: ECOPIA TECH CORPORATION, Toronto (CA)

( * ) Notice: Subject to any disclaimer, the term of this patent is extended or adjusted under 35 U.S.C. 154(b) by 161 days.

(21) Appl. No.: 18/402,893

(22) Filed: Jan. 3, 2024

(65) Prior Publication Data

US 2025/0005858 A1 Jan. 2, 2025

Related U.S. Application Data

(60) Provisional application No. 63/595,851, filed on Nov. 3, 2023, provisional application No. 63/511,214, filed on Jun. 30, 2023.

(51) Int. Cl.
*G06T 17/05* (2011.01)
*G06T 19/20* (2011.01)
(Continued)

(52) U.S. Cl.
CPC .............. *G06T 17/05* (2013.01); *G06T 19/20* (2013.01); *G06V 10/25* (2022.01); *G06V 10/40* (2022.01); *G06T 2219/2004* (2013.01)

(58) Field of Classification Search
CPC . G06T 17/05; G06T 19/20; G06T 2219/2004; G06T 17/20; G06V 10/25; G06V 10/40
See application file for complete search history.

(56) References Cited

U.S. PATENT DOCUMENTS

| | | | |
|---|---|---|---|
| 2014/0081605 A1 | 3/2014 | Susaki et al. | |
| 2019/0188516 A1 | 6/2019 | Porter et al. | |
| (Continued) | | | |

FOREIGN PATENT DOCUMENTS

| | | |
|---|---|---|
| CN | 109579784 A | 4/2019 |

OTHER PUBLICATIONS

Biljecki et al.—"The variants of an LOD of a 3D building model and their influence on spatial analyses"—2016. (Year: 2016).*
(Continued)

*Primary Examiner* — Daniel F Hajnik
*Assistant Examiner* — Adeel Bash
(74) *Attorney, Agent, or Firm* — Damian Rolfe

(57) ABSTRACT

Methods and systems for enhancing elevation models with landcover feature data are provided. An example method involves accessing imagery covering an area of interest that contains an above-ground feature, generating, a digital surface model of the area of interest, extracting three-dimensional landcover feature data representing the above-ground feature that contains one or more actual ground-level points at the base of the above-ground feature, and generating a digital terrain model from the digital surface model at least in part by removing the above-ground feature from the digital surface model and filling at least some of the removed area with one or more of the actual ground-level points from the three-dimensional landcover feature data.

15 Claims, 5 Drawing Sheets

(51) Int. Cl.
  G06V 10/25 (2022.01)
  G06V 10/40 (2022.01)

(56) References Cited

U.S. PATENT DOCUMENTS

| | | |
|---|---|---|
| 2021/0104182 A1 | 4/2021 | Miller et al. |
| 2023/0074265 A1 | 3/2023 | Ding et al. |

OTHER PUBLICATIONS

Champion et al.—"A robust algorithm for estimating digital terrain models from digital surface models in dense urban areas"—2006. (Year: 2006).*

Li et al.—"A Deep Learning-Based Framework for Automated Extraction of Building Footprint Polygons from Very High-Resolution Aerial Imagery"—2021. (Year: 2021).*

Yu et al.—"Advanced approach for automatic reconstruction of 3D buildings from aerial images"—2020. (Year: 2020).*

Dawei Zai, et. al., 3-D Road Boundary Extraction From Mobile Laser Scanning Data VIA Supervoxels and Graph Cuts, IEEE Transactions on Intelligent Transportation Systems, Mar. 1, 2018, vol. 19, pp. 802-813, retrieved from: https://uwaterloo.ca/geospatial-intelligence/sites/default/files/uploads/files/3d_road_boundary_extraction_from_mobile_laser_scanning_data_via_supervoxels_and_graph_cuts.pdf.

PCT/IB2024/052274, International Search Report, May 23, 2024.

PCT/IB2024/052274, Written Opinion of the International Searching Authority, May 23, 2024.

Notice of Allowance to U.S. Appl. No. 19/176,420, dated May 20, 2025.

* cited by examiner

400

START

Access Imagery
402

Generate
Digital Surface Model
404

Extract 2D Landcover
Feature Data
406

Generate Preliminary Digital
Terrain Model
408

Extract 3D Landcover
Feature Data
410

Generate Refined Digital
Terrain Model
412

END

ENHANCING ELEVATION MODELS WITH LANDCOVER FEATURE DATA

CROSS-REFERENCE TO RELATED APPLICATIONS

The present application claims priority to U.S. Provisional Patent Application No. 63/511,214, filed Jun. 30, 2023, entitled ENHANCING ELEVATION MODELS WITH LANDCOVER FEATURE DATA, and to U.S. Provisional Patent Application No. 63/595,851, filed Nov. 3, 2023, entitled ENHANCING ELEVATION MODELS WITH LANDCOVER FEATURE DATA, each of which are incorporated herein by reference in their entireties.

BACKGROUND

The three-dimensional contours of the surface of the Earth may be modeled by various kinds of elevation models. Although definitions vary, for the purposes of this disclosure, a digital terrain model (DTM) refers to any kind of elevation model that aims to represent the bare terrain of the Earth, without any of its above-ground features. A digital surface model (DSM), on the other hand, refers to any kind of elevation model that aims to represent the full contours of the Earth's surface, including any natural or built features that add appreciable height to the terrain, such as trees and buildings. These elevation models can be generated from various data sources, such as contour maps, geospatial imagery, or LiDAR data. In terms of practical applications, DTMs and DSMs are a valuable form of geospatial data that may be used in engineering, environmental modeling, urban planning, land-use planning, and disaster management, among other applications.

DETAILED DESCRIPTION

Elevation models, including digital terrain models (DTMs) and digital surface models (DSMs), are valuable forms of geospatial data that can be extracted from satellite and/or aerial imagery. The accuracy of these elevation models, however, can be limited by various factors such as the resolution of source imagery, and by limitations of the three-dimensional reconstruction algorithms employed. Further, above-ground features captured in a DSM are oftentimes reconstructed with indistinct boundaries that blur into the surrounding terrain.

However, as proposed in this disclosure, the accuracy of elevation models can be improved by leveraging landcover feature data representing landcover features in the areas covered by the elevation models. For instance, as will be seen below, a DTM may be made more accurate by leveraging ground-level points obtained from three-dimensional building models. As another example, a DSM may be made more accurate by incorporating landcover feature data that sharply defines the boundaries around certain landcover features.

The landcover feature data that is used to enhance such elevation models may be extracted from imagery using machine learning models trained to extract such features. In some cases, the landcover feature data may even be extracted from the same imagery that was used to generate the elevation models themselves. Therefore, the accuracy of elevation models may be improved without the need to obtain additional data sources. The following description provides in greater detail a set of non-limiting exemplary systems and methods for how such improvements may be achieved.

Figure 1:
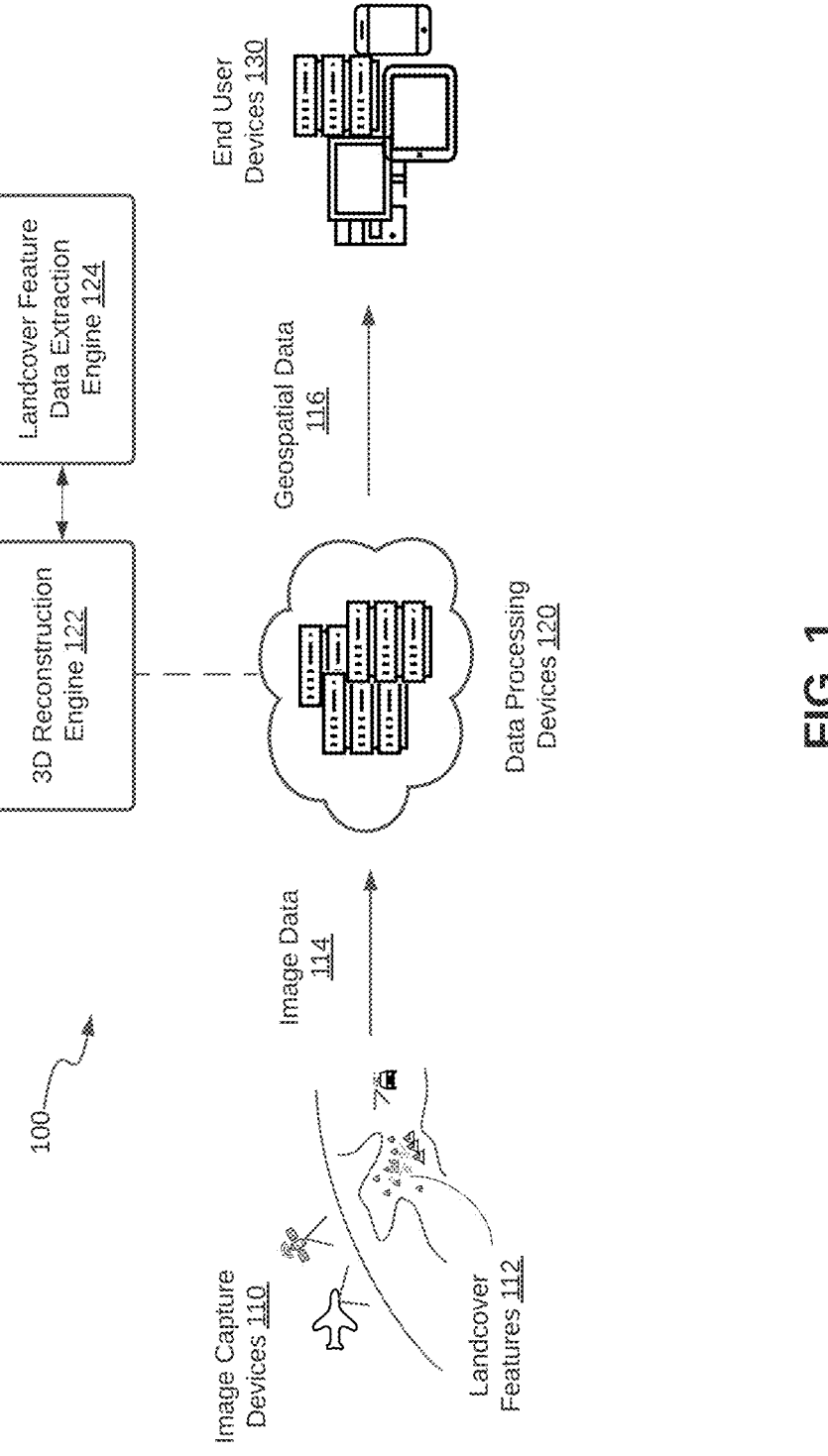
FIG. 1 is a schematic diagram of an example system for extracting geospatial data from imagery including elevation models according to the present disclosure.

FIG. 1 is a schematic diagram of an example system 100 for extracting geospatial data, including elevation models, from imagery. The system 100 includes one or more image capture devices 110 to capture image data 114 over an area of interest. The area of interest will generally comprise bare earth terrain with varying elevation, natural features such as grassland, shrubs, water, forests, and built features such as buildings, bridges, and roads. Any of such natural and built features may be referred to as landcover features 112. Some landcover features 112 may add negligible elevation to the terrain, such as grassland and roads. Other landcover features 112 may add significant elevation, such as buildings, bridges, and forests. For the purposes of this disclosure, landcover features 112 that add significant elevation to the terrain, whether natural or built features, may be referred to as above-ground features.

An image capture device 110 may include any suitable sensor (e.g., camera) onboard an aircraft, satellite, drone, observation balloon, or other device capable of capturing image data 114 over an area of interest from an overhead point of view. This kind of imagery may be referred to as geospatial imagery for the purposes of this disclosure. An image capture device 110 (or multiple image capture devices 110) should be capable of capturing an overhead view of the area of interest from multiple perspectives to enable three-dimensional reconstruction of the area. Most commonly, either aerial imagery or satellite imagery, or a combination of the two, may be used. In some cases, geospatial imagery may be supplemented with ground-level or near-ground level imagery to enhance the 3D reconstruction process. In general, the type of imagery captured may include any combination of nadir imagery, off-nadir imagery, or oblique imagery, and other types of imagery, as appropriate.

The image data 114 may refer to the raw image data captured by the image capture devices 110 along with any associated metadata, such as camera parameters (e.g., intrinsic parameters and exterior orientation parameters), geospatial projection information (e.g., latitude and longitude position), or other relevant metadata. The image data 114 may contain several batches of imagery which may have been captured on the same dates, or on different dates, captured from a single image capture device 110 or multiple image capture devices 110.

The system 100 further includes one or more data processing devices 120 to process the image data 114 to generate geospatial data 116 as described herein. For the purposes of this disclosure, the term geospatial data is used broadly to refer to any kind of semantic information extracted from geospatial imagery, including two-dimensional and three-dimensional landcover feature data, as well as elevation models such as DSMs and DTMs.

The data processing devices 120 include one or more computing devices, such as virtual machines or servers in a cloud computing environment comprising one or more processors for executing computing instructions. In addition to processing capabilities, the data processing devices 120 include one or more communication interfaces to receive/obtain/access the image data 114 and to output/transmit geospatial data 116 through one or more computing networks and/or telecommunications networks such as the internet. Such computing devices further include memory (i.e., non-transitory machine-readable storage media) to store programming instructions that embody the functionality described herein.

The data processing devices 120 are configured to run (i.e., store, host or access) a 3D reconstruction engine 122 and a landcover feature data extraction engine 124, each of which is depicted as a functional unit that may comprise one or more programs, software modules, or other set of non-transitory machine-readable instructions, to carry out the functionality described herein. However, it is to be understood that the separation of the two engines 122/124 as two functional units is for illustrative purposes only, and that the functionality described herein may be achieved by one or more functional units in any number of configurations. The 3D reconstruction engine 122 is configured to process the image data 114 to generate at least the elevation models (e.g., DTMs and DSMs) as described herein. The landcover feature data extraction engine 124 is configured to process the image data 114 to extract two-dimensional and/or three-dimensional vector data representations of landcover features 112. As will be seen below, the 3D reconstruction engine 122 and the landcover feature data extraction engine 124 may cooperate to enhance the extracted elevation models.

Once the geospatial data 116 is generated, the data processing devices 120 may provide such geospatial data 116 to one or more end user devices 130. An end user device 130 may include one or more computing devices configured to run (i.e., store, host or access) one or more software programs, whether hosted on the end user device 130 directly or accessed remotely, such as through a web browser, to display, process, or otherwise use the geospatial data 116 (e.g., a GIS data viewing platform). In some examples, an end user device 130 may include a display device and a user interface to allow a user to view and manipulate the geospatial data 116.

Figure 2:
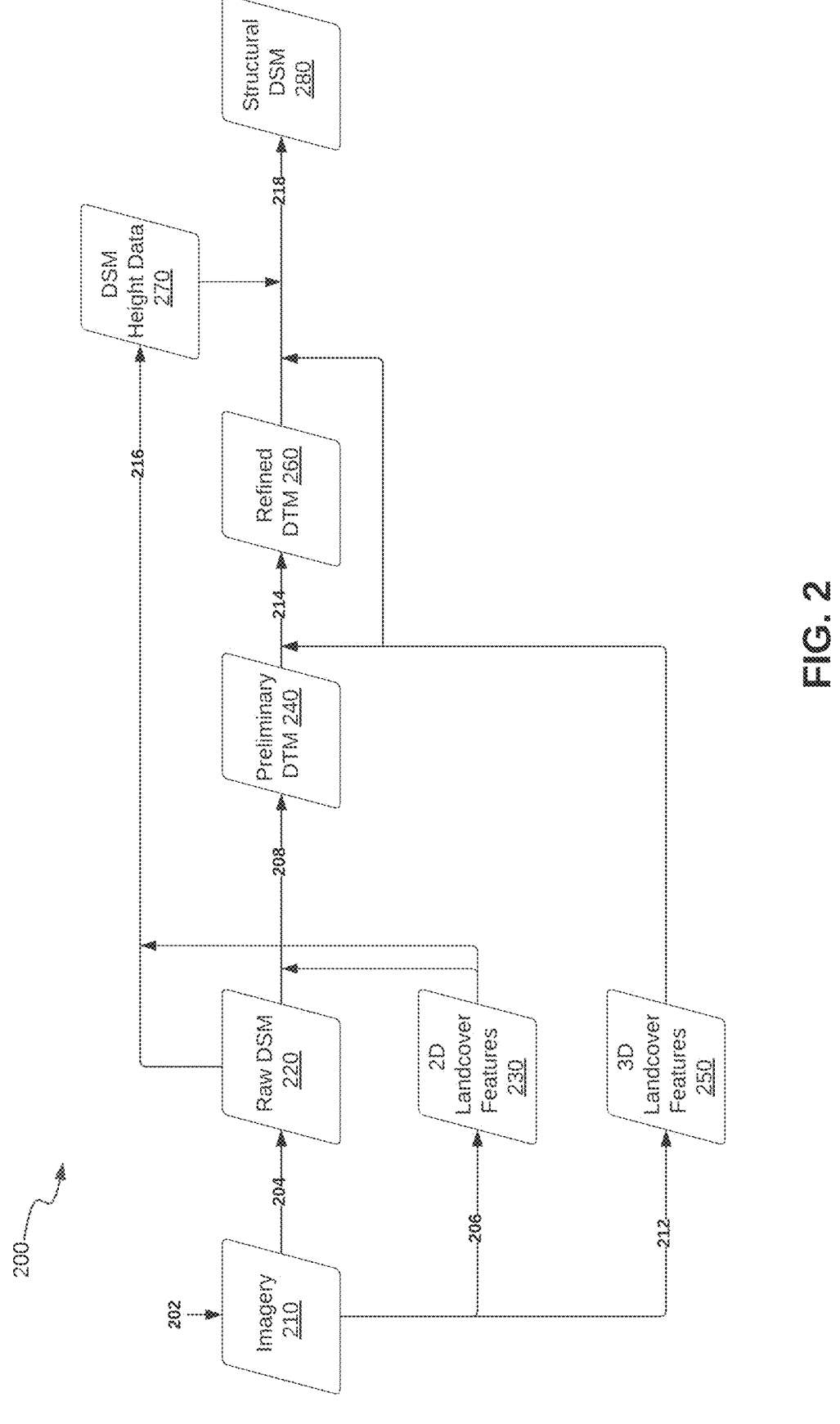
FIG. 2 is a schematic diagram depicting an example three-dimensional reconstruction workflow that involves generating a digital terrain model and a digital surface model according to the present disclosure. The workflow involves generating a preliminary digital terrain model and then refining the preliminary digital terrain model using three-dimensional building vector data to produce more accurate ground-level points. The workflow also involves generating a raw digital surface model and then augmenting the raw digital surface model with vector data to produce more sharply defined contours around certain landcover features.

FIG. 2 is a schematic diagram depicting an example three-dimensional reconstruction workflow that involves generating an enhanced digital terrain model and an enhanced digital surface model. The series of steps involved in the workflow is referred to as the method 200. In FIG. 2, the various data types that are involved in the workflow are indicated as boxes (e.g., 210, 220, 230, 240, 250, 260, 270, 280), whereas the steps of the method 200, whereby these various data types are accessed, generated, or manipulated, are indicated along lines connecting the boxes (e.g., 202, 204, 206, 208, 212, 214, 216, 218).

The method 200 may be applied in any suitable system for extracting elevation model data from imagery. For example, the method 200 may be applied in the system 100 according to the following workflow. Thus, the description of the system 100 of FIG. 1 may be referenced for further details regarding the steps of the method 200.

At step 202, the method 200 involves accessing imagery 210 covering an area of interest. For example, as described above, the imagery 210 may comprise aerial imagery, satellite imagery, and/or other forms of imagery. Further, the area of interest may contain a number of landcover features including natural features and built features. Some of these landcover features may include above-ground features with appreciable height such as buildings or trees.

Although not shown in FIG. 2, the imagery 210 may be pre-processed in various ways to prepare for the further steps of the method 200. For example, satellite imagery may undergo pan sharpening, cloud detection, and image blending processes, prior to its use in further steps.

At step 204, the method 200 involves generating a digital surface model 220 from the imagery 210. As described above, the digital surface model 220 represents the contours of the area of interest, including its above-ground features. At this stage, the raw digital surface model may be generated according to well-understood methods, including feature matching and point triangulation, as described above. However, it should also be noted that the digital surface model 220 is also georeferenced (e.g., attributed with geospatial coordinates), to facilitate the merger of the data points in the raw digital surface model 220 with other datasets as described below. At this stage, the digital surface model 220 may be referred to as a "raw" digital surface model 220, as it is not yet enhanced with vector data as described in this disclosure.

Generating the raw digital surface model 220 may begin with conducting orthorectification on the imagery being used. Orthorectification may be performed at this stage with reference to a pre-existing DTM dataset, such as, for example, the publicly-available Shuttle Radar Topography Mission (SRTM) dataset. The ortho-corrected images may then pass through a sparse feature detection algorithm, such as, for example, the SuperPoint algorithm, thereby generating a sparse set of features for each image. Next, the sparse features may undergo a feature matching process, such as, for example, the Random Sampling Consensus (RANSAC) algorithm, resulting in a sparse set of features that are matched across the images. Further, the matched features may then be used in bundle adjustment to generate a sparse point cloud and exterior orientation camera parameters (the camera parameters determined by bundle adjustment may be more accurate than camera parameters provided in image metadata). For satellite imagery, for simplicity, the bundle adjustment process may be limited to determining translation parameters. Finally, the sparse point cloud may be used as a seed for a dense matching algorithm, using, for example, the Semi-Global Matching (SGM) algorithm, resulting in a dense point cloud covering the area of interest. This dense point cloud may be used as the raw digital surface model 220.

At step 206, the method 200 involves extracting two-dimensional landcover features 230 from the imagery 210. Such landcover features may be extracted as vector data comprising a collection of points and/or lines in approximately the XY or "ground" plane, which form polygons representing the outlines of the various landcover features identified in the imagery. As with the DSM, the landcover features are georeferenced (e.g., attributed with geospatial coordinates), thereby allowing the two-dimensional landcover features 230 to be directly merged with (or at least compared to) the points of the raw digital surface model 220.

The two-dimensional landcover features 230 may include representations of natural features such as grass, bare land, and trees, and built features such as buildings, roads, and bridges. Notably, the landcover features will include at least some above-ground features, such as trees, which are to be removed from the DSM to create the DTM.

In some cases, as a preliminary step prior to extracting the two-dimensional landcover features 230 from the imagery, a cutline process may be applied to the imagery to determine the most appropriate image to use for each region of the area of interest.

As mentioned above, the two-dimensional landcover features 230 may be extracted by a machine learning process. The process may involve applying a machine learning model that is trained to extract landcover features as vector data in two dimensions from single images. For example, the two-dimensional landcover features 230 may be extracted according to the disclosure set out in U.S. patent application Ser. No. 17/731,769, entitled MACHINE LEARNING FOR VECTOR MAP GENERATION, filed Apr. 28, 2022, the entirety of which is hereby incorporated by reference.

In some cases, the two-dimensional landcover features 230 extracted at this stage may be understood to be "preliminary" in the sense that they are extracted primarily for the purposes of generating the DTM from the DSM, and/or to enhance the DSM as described later in this disclosure. Thus, the feature extraction process at this stage may be limited to simply extracting these above-ground features, while additional two-dimensional landcover features may be extracted for further use, such as from an orthomosaic, once generated, at a later stage.

At step 208, the method 200 involves generating a preliminary digital terrain model 240 based on the raw digital surface model 220. The preliminary digital terrain model 240 is generated by removing the above-ground features, as represented in the two-dimensional landcover features 230, from the raw digital surface model 220. One way in which the above-ground features can be removed from the raw digital surface model 220 is by identifying any points of the georeferenced raw digital surface model 220 that fall within the boundaries of the georeferenced two-dimensional landcover features 230 and removing the identified points from the raw digital surface model 220.

The areas that are removed from the raw digital surface model 220 are then filled with estimated ground-level points. The ground-level points may be estimated by interpolation based on the remaining points of the raw digital surface model 220 that surround the removed areas. For example, a non-linear optimization algorithm may be used to estimate these ground level points. The result is the preliminary digital terrain model 240.

When a non-linear optimization algorithm is to be applied, the non-linear optimization problem may be defined as set out in Equation 1 below:

$$E(f) = E_{data}(f) + \lambda \cdot E_{smooth}(f) \tag{1}$$

where $E_{smooth}$ measures the piecewise smoothness of f, $E_{data}$ measures the variation between f and the observation data (i.e., the remaining ground-level points), and λ is a weighting parameter.

At step 212, the method 200 involves extracting three-dimensional landcover features 250 from the imagery 210. Such landcover features may be extracted as vector data comprising a collection of points and/or lines in a three-dimensional coordinate system that form polygons and/or volumes representing the outer contours of the various landcover features identified in the imagery. As with the two-dimensional landcover features 230, the three-dimensional landcover features are georeferenced (e.g., attributed with geospatial coordinates), thereby allowing the landcover features to be merged with the raw digital surface model 220 and/or preliminary digital terrain model 240.

The three-dimensional landcover features 250 may represent any landcover features with appreciable height, such as trees, and built features with appreciable height such as buildings and bridges. However, for the purposes of the present disclosure, the three-dimensional landcover features 250 should be generally understood to include 3D building models (i.e., 3D building footprints), as the ground-level points of these 3D building models may be used to enhance a DTM as described below. However, in general, any three-dimensional landcover feature may be capable of assisting in the refinement of a DTM in this way.

As a preliminary step, in some cases, prior to extracting the three-dimensional landcover features 250, an imagery selection process may be performed to determine a subset of the imagery 210 to be used for the extraction process. For example, the imagery 210 may contain many images covering any given area (e.g., 50 images), and this large set of imagery may be reduced to a more manageable selection (e.g., 3-6 images) that are most appropriate for three-dimensional feature extraction. The most appropriate images may be selected for any given area based on a number of factors, such as those with the highest resolution over the area, those captured from distinct perspectives, and those captured most recently.

As mentioned above, the three-dimensional landcover features 250 may be extracted by a machine learning process. The process may involve applying a machine learning model that is trained to extract landcover features as vector data in three-dimensions from multiview imagery. For example, 3D building models may be extracted according to the disclosure set out in U.S. patent application Ser. No. 18/319,553, entitled VECTOR DATA PROJECTION AND FEATURE MATCHING TO DETERMINE THREE-DIMENSIONAL STRUCTURE, filed May 18, 2023, the entirety of which is hereby incorporated by reference.

At step 214, the method 200 involves refining the preliminary digital terrain model 240 to produce a refined digital terrain model 260. The refinement process involves updating the preliminary digital terrain model 240 with ground-level points obtained from the three-dimensional landcover features 250. For example, the ground-level points obtained from the 3D building models may be used as a seed (i.e., an additional constraint) in the non-linear optimization process that is used to fill the removed areas of the raw digital surface model 220. With these additional constraints, the accuracy of terrain elevation is improved, resulting in the refined digital terrain model 260.

When a non-linear optimization process is to be applied, and when ground-level points from extracted landcover features (e.g., 3D building models) are to be used as additional constraints, $E_{data}(f)$ in Equation 1 above may be defined as set out below in Equation 2:

$$E_{data} = \sum_{p_i \in P} d(f_{p_i}) \qquad (2)$$

where $d(f_{p_i})$ measures the extent to which the label $f_{p_i}$ fits the point $p_i$ in observation data, P is the set of all points to optimize (including fixed terrain points, ground-level points obtained from extracted landcover features, and interpolated points).

In some cases, this refinement process may be limited only to ground-level points obtained from 3D buildings models, as there may be available techniques that are particularly precise in determining the three-dimensional structure of 3D buildings, which generally possess regular features such as vertically straight walls and right angled-corners. In other cases, the refinement process may include ground-level points obtained from other 3D structures, such as bridges, overpasses, or any other three-dimensional structure for which an accurate estimation of its ground-level points is available.

At step 216, the method 200 involves extracting height data 270 from the raw digital surface model 220 to augment the two-dimensional landcover features 230 with height information to be incorporated into in the "structural" digital surface model 280. In some cases, the extracted height data 270 may simply comprise one or more of the raw data points of the raw digital surface model 220. In other cases, a derivative of the raw data points of the raw digital surface model 220 may be used. For example, a forest polygon may be extruded to the average height of all of the raw data points in the digital surface model 220 in the area corresponding to the forest polygon, thereby providing a simplified visualization of the height of the forest. In any case, a two-dimensional landcover feature 230 is augmented with height data extracted from the raw digital surface model 220 to produce a three-dimensional volume, and this three-dimensional volume remains bounded in the XY or "ground" plane by boundaries of the two-dimensional vector data, to give the impression of a sharply defined feature.

At step 218, a "structural" digital surface model 280 is assembled using selections of the previously generated data. In particular, the structural digital surface model 280 includes the refined digital terrain model 260 and the two-dimensional landcover features 230 as augmented with DSM height data 270 to provide sharp boundary definition. In some cases, the structural digital surface model 280 may also include any three-dimensional landcover features 250 (e.g., 3D building models) directly placed on the refined digital terrain model 260. The result is a DSM that resembles the raw digital surface model 220 but with more sharply defined features. Further, since the inserted landcover feature data is of a known landcover feature type, the structural DSM is enhanced to contain context information (i.e., can be attributed with feature types).

Figure 3:
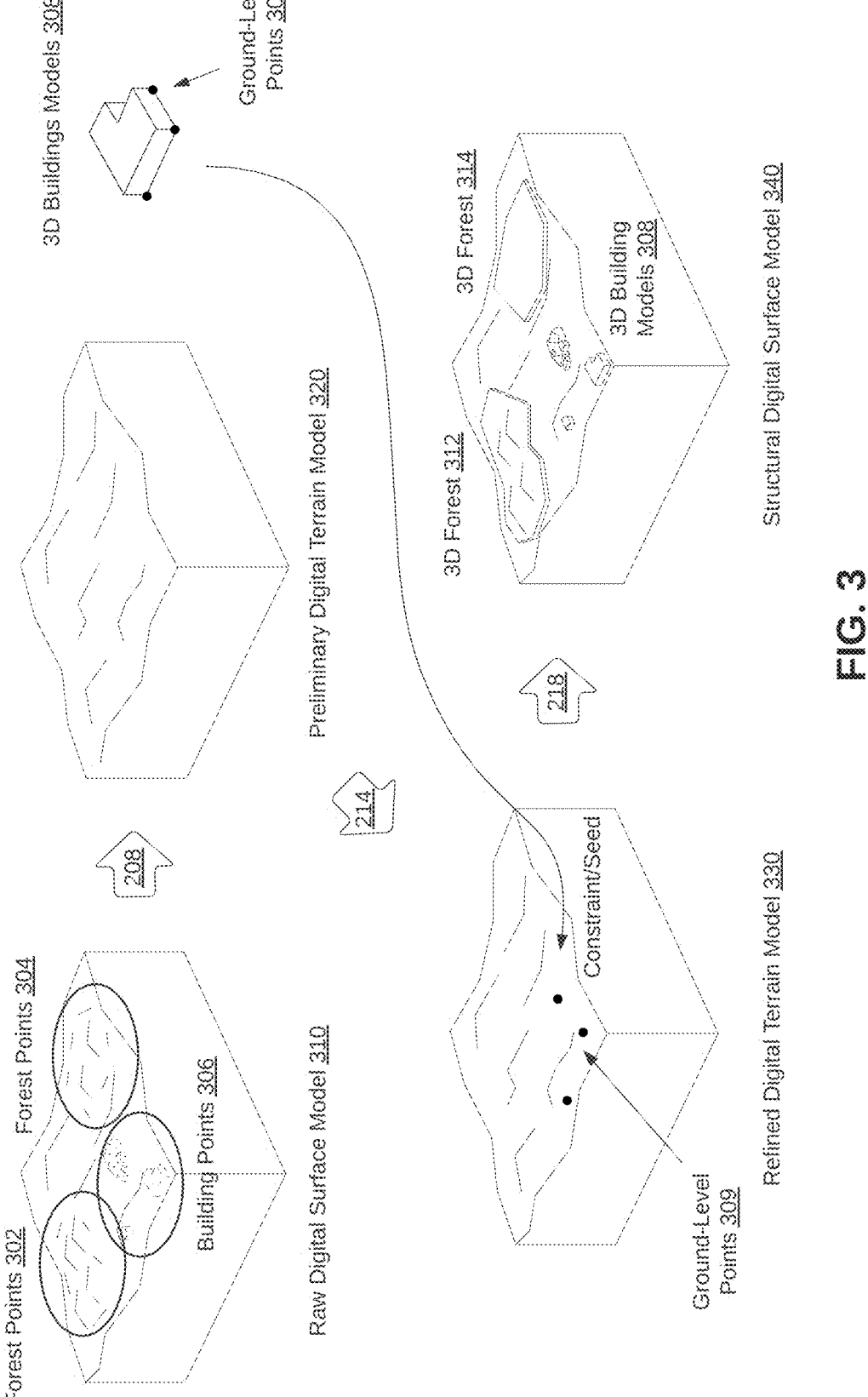
FIG. 3 illustrates the progression of a raw digital surface model into a preliminary digital terrain model, and further into a refined digital terrain model, and further into a structural digital surface model, according to the workflow set out in FIG. 2 of the present disclosure.

FIG. 3 illustrates the progression of a raw digital surface model 310 into a preliminary digital terrain model 320, and further into a refined digital terrain model 330, and further into a structural digital surface model 340, according to the method 200 described in FIG. 2.

For exemplary purposes, the area of interest covered by the raw digital surface model 310 is depicted as containing two forested areas, represented as forest points 302 and forest points 304, and an area containing several residential homes, represented as building points 306. As can be seen, in the raw digital surface model 310, these features are not represented as distinct features separate from the surrounding terrain, but rather, appear as part of a continuous landscape of points (not yet defined with sharp boundaries).

The raw digital surface model 310 is converted into a preliminary digital terrain model 320 by removing the above-ground features (for example, as described in step 208 of the method 200 of FIG. 2). That is, the forest points 302, forest points 304, and building points 306 are removed from the raw digital surface model 310, and the underlying ground-level points are estimated, by, for example, non-linear optimization.

The preliminary digital terrain model 320 is then enhanced using the ground-level points 309 obtained from a set of 3D building models 308 (for example, as described in step 214 of the method 200 of FIG. 2). The 3D building models 308 are more accurate representations of the buildings represented by the building points 306 in the raw digital surface model 310. The ground-level points 309 are obtained and used as a seed to further constrain the non-linear optimization algorithm by which the terrain contours beneath the removed buildings are estimated. The result is the refined digital terrain model 330.

A structural digital surface model 340 is then assembled using the previously generated data (for example, as described in step 218 of the method 200 of FIG. 2). First, the refined digital terrain model 330 is used as a base map. Building on this base map, the areas in which the landcover features were removed from the raw digital surface model 310 (corresponding to the forest points 302, 304, and building points 306) are filled with landcover feature data. In the case of the removed building features, 3D building models 308 may be directly incorporated into the structural digital surface model 340. In the case of the other landcover features that were removed (e.g., the forested areas and bridges), two-dimensional polygons and associated height data extracted from the raw digital surface model 310 may be used.

In the present example, the forested area previously represented by the forest points 302 in the raw digital surface model 310 is now represented by an outline polygon derived from two-dimensional landcover feature data filled with height points derived from DSM data (indicated as 3D forest 312). In other words, the 3D forest 312 comprises a volume of the DSM that was "cut out" or "cropped" from the DSM using the outline of the two-dimensional landcover feature data, and inserted into the DTM. As a result, the 3D forest 312 provides a detailed representation of the forest canopy, while also featuring a sharply defined boundary (in the XY plane), in contrast to the cloud of points in the original raw digital surface model 310.

As another illustrative example, the forested area previously represented by the forest points 304 in the raw digital surface model 310 is now represented by an outline polygon derived from two-dimensional landcover feature data filled with an average height derived from DSM data (indicated as 3D forest 314). As a result, the 3D forest 314 provides a compact and neatly-defined volume with sharply defined boundaries corresponding to the forested area.

In some cases, the refined digital terrain model and the structural digital surface model may be generated as part of the same workflow, as depicted in FIG. 2. However, in some cases, the refined digital terrain model and the structural digital surface model may be generated independently of one another (as separate workflows). Therefore, FIG. 4 and FIG. 5 summarize the methods for generating a refined digital terrain model, and a structural digital surface model, respectively.

Figure 4:
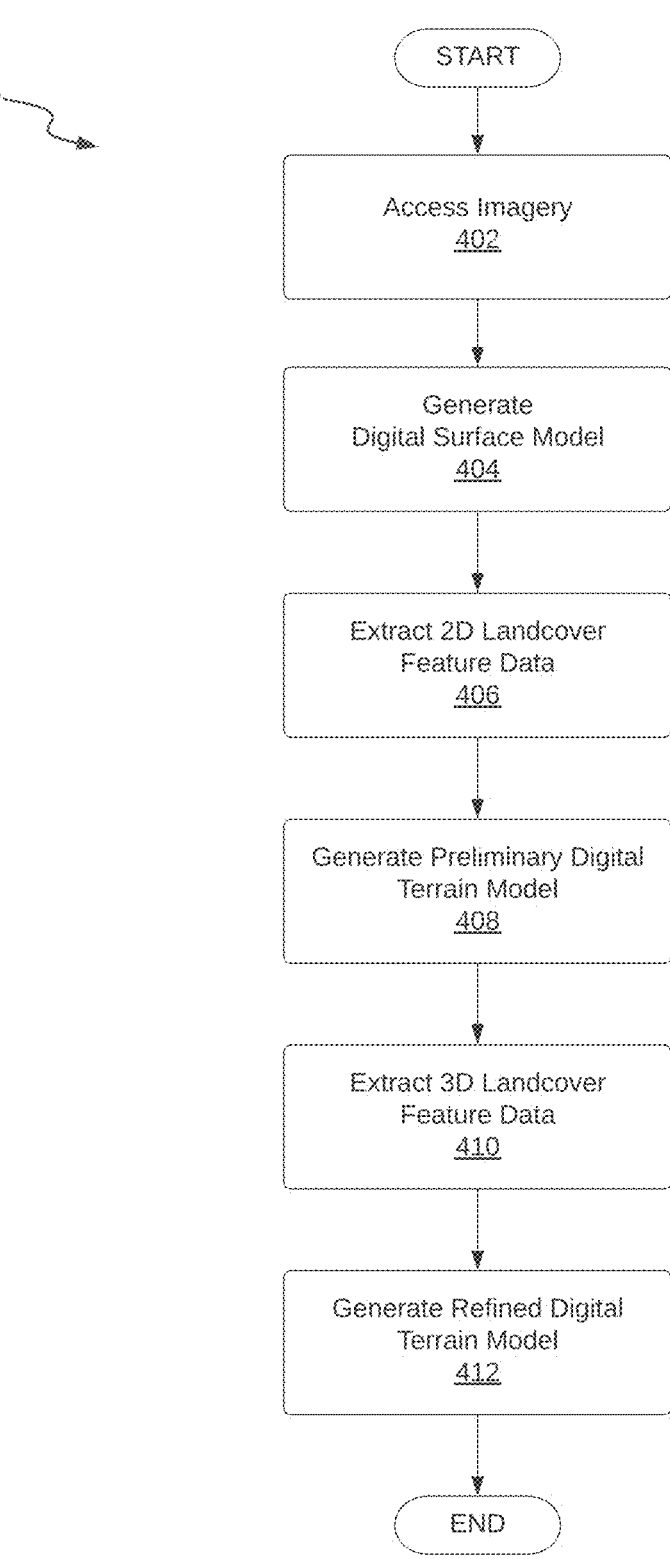
FIG. 4 is a flowchart of an example method for generating a refined digital terrain model according to the present disclosure.

FIG. 4 is a flowchart of an example method 400 for generating a refined digital terrain model according to the present disclosure. The method 400 may be understood to be a summary of the previously-described steps of the method 200 that pertain to refining a digital terrain model, but without necessarily involving the generation of a structural digital surface model.

At step 402, imagery covering an area of interest that contains an above-ground feature is accessed. At step 404, a digital surface model that represents the contours of the area of interest, including the above-ground feature, is generated from the imagery. At step 406, two-dimensional landcover feature data representing the above-ground feature is extracted from the imagery. At step 408, a preliminary digital terrain model is generated based on the digital surface model (and the two-dimensional land cover data representation of the above-ground feature) by removing the above-ground feature from the digital surface model and filling the removed area with estimated ground-level points. At step 410, three-dimensional landcover feature data representing the above-ground feature is extracted from the imagery. The three-dimensional landcover feature data representation contains one or more points representing the ground-level elevation at the base of the above-ground feature. At step 412, a refined digital terrain model is generated, based on the preliminary digital terrain model and the three-dimensional vector data representation of the above-ground feature, using the ground-level points at the base of the above-ground feature.

Figure 5:
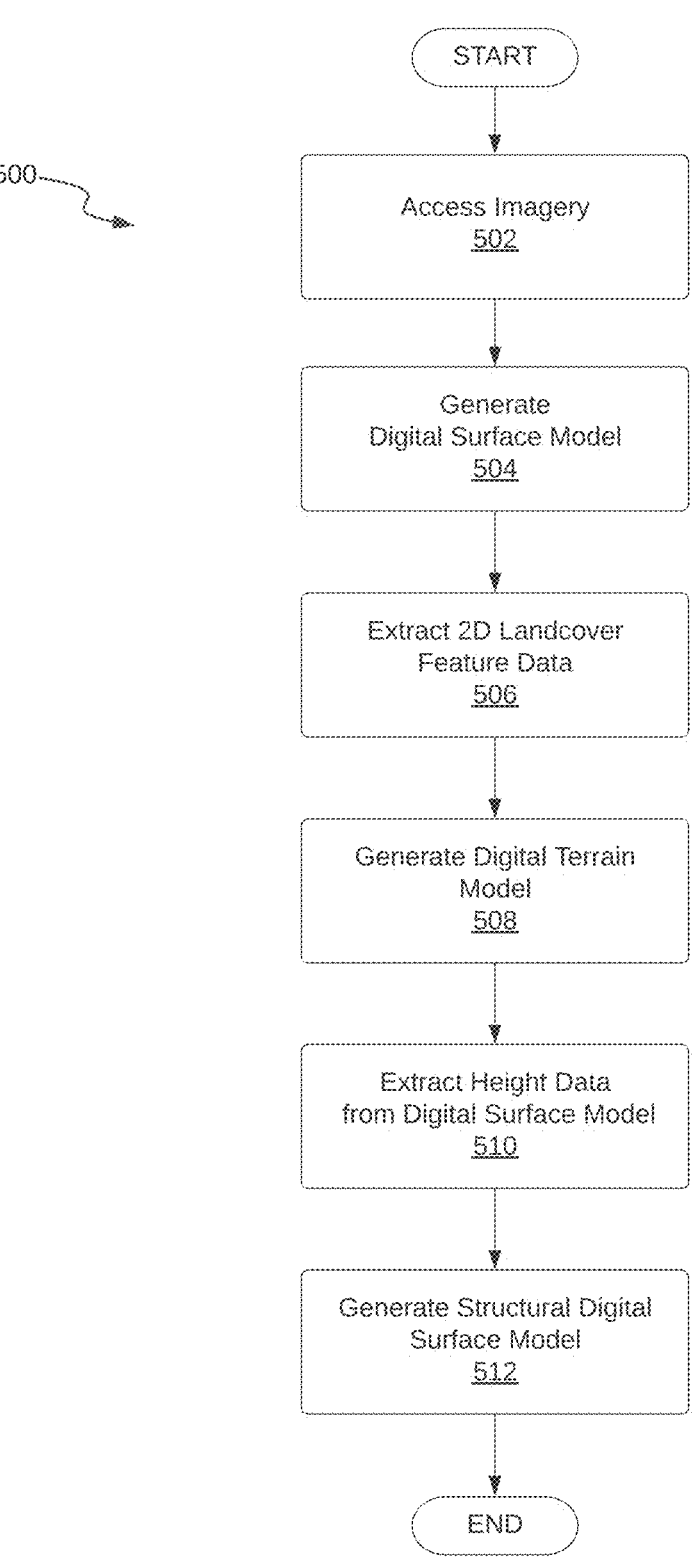
FIG. 5 is a flowchart of an example method for generating a structural digital surface model according to the present disclosure.

FIG. 5 is a flowchart of an example method 500 for generating a structural digital surface model according to the present disclosure. The method 500 may be understood to be a summary of the previously-describes steps of the method 200 that pertain to generating a structural digital surface model, but without necessarily involving the refinement of a digital terrain model.

At step 502, imagery covering an area of interest that contains an above-ground feature is accessed. At step 504, a digital surface model that represents the contours of the area of interest, including the above-ground feature, is generated. At step 506, two-dimensional landcover feature data representing the above-ground feature is extracted from the imagery. At step 508, a digital terrain model is generated, based on the digital surface model (and the two-dimensional landcover feature data representation of the above-ground feature) by removing the above-ground feature from the digital surface model and filling the removed area with one or more estimated ground-level points. At step 510, height data is extracted from the digital surface model that corresponds to the area covered by the two-dimensional landcover feature data representing the above-ground feature. At step 512, a structural digital surface model is generated by incorporating the two-dimensional landcover feature data representing the above-ground feature, combined with the height data, into the digital terrain model.

As can be seen from the above disclosure, the accuracy elevation models representing the contours of the surface and/or terrain over an area of interest may be enhanced with reference to landcover feature data representing landcover features located in the same area. Since elevation models and landcover feature data may each be extracted from the same source imagery, these techniques may be employed to improve the accuracy of elevation models without the need to obtain additional source data.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method comprising:

accessing geospatial imagery covering an area of interest, wherein the area of interest includes one or more building features and one or more above-ground natural landcover features;

generating, from the geospatial imagery, a digital surface model over the area of interest, wherein the digital surface model includes one or more above-ground points corresponding to the one or more building features and the one or more above-ground natural landcover features;

extracting, from the geospatial imagery, first two-dimensional vector data that represents one or more boundaries of the one or more building features, and second two-dimensional vector data that represents one or more boundaries of the one or more above-ground natural landcover features;

generating a preliminary digital terrain model over the area of interest, wherein generating the preliminary digital terrain model involves removing from the digital surface model portions of the digital surface model that represent above-ground points bound by the first and second two-dimensional vector data;

generating first three-dimensional vector data that represents the one or more building features, wherein the first three-dimensional vector data includes one or more ground-level points at one or more bases of the one or more building features;

generating a refined digital terrain model over the area of interest, wherein generating the refined digital terrain model involves inserting the one or more ground-level points of the first three-dimensional vector data into the preliminary digital terrain model and filling the preliminary digital terrain model between the one or more ground-level points with one or more estimated ground-level points;

generating second three-dimensional vector data that represents the one or more above-ground natural landcover features based on the second two-dimensional vector data and the above-ground points bound by the second two-dimensional vector data; and combining the refined digital terrain model with the first three-dimensional vector data and the second three-dimensional vector data to produce a structural digital surface model.

2. The method of claim 1, wherein:

generating the second three-dimensional vector data involves deriving a height attribute for an above-ground natural landcover feature from one or more raw data points of the digital surface model located within the area bound by the second two-dimensional vector data.

3. The method of claim 1, wherein:

filling the preliminary digital terrain model between the one or more ground-level points with one or more estimated ground-level points involves using a non-linear optimization process in which the one or more ground-level points of the first three-dimensional vector data are used a seed in the non-linear optimization process.

4. The method of claim 1, wherein generating the first three-dimensional vector data comprises:

applying a machine learning model trained to extract three-dimensional building features from the accessed geospatial imagery.

5. The method of claim 1, wherein the three-dimensional landcover feature comprises forest canopy.

6. A system comprising one or more computing devices configured to:

access geospatial imagery covering an area of interest, wherein the area of interest includes one or more building features and one or more above-ground natural landcover features;

generate, from the geospatial imagery, a digital surface model over the area of interest, wherein the digital surface model includes one or more above-ground points corresponding to the one or more building features and the one or more above-ground natural landcover features;

extract, from the geospatial imagery, first two-dimensional vector data that represents one or more boundaries of the one or more building features, and second two-dimensional vector data that represents one or more boundaries of the one or more above-ground natural landcover features;

generate a preliminary digital terrain model over the area of interest, wherein generating the preliminary digital terrain model involves removing from the digital surface model portions of the digital surface model that represent above-ground points bound by the first and second two-dimensional vector data;

generate first three-dimensional vector data that represents the one or more building features, wherein the first three-dimensional vector data includes one or more ground-level points at one or more bases of the one or more building features;

generate a refined digital terrain model over the area of interest, wherein generating the refined digital terrain model involves inserting the one or more ground-level points of the first three-dimensional vector data into the preliminary digital terrain model and filling the preliminary digital terrain model between the one or more ground-level points with one or more estimated ground-level points;

generate second three-dimensional vector data that represents the one or more above-ground natural landcover features based on the second two-dimensional vector data and the above-ground points bound by the second two-dimensional vector data; and combine the refined digital terrain model with the first three-dimensional vector data and the second three-dimensional vector data to produce a structural digital surface model.

7. The system of claim 6, wherein:

generating the second three-dimensional vector data involves deriving a height attribute for an above-ground natural landcover feature from one or more raw data points of the digital surface model located within the area bound by the second two-dimensional vector data.

8. The system of claim 6, wherein:

filling the preliminary digital terrain model between the one or more ground-level points with one or more estimated ground-level points involves using a non-linear optimization process in which the one or more ground-level points of the first three-dimensional vector data are used a seed in the non-linear optimization process.

9. The system of claim 6, wherein generating the first three-dimensional vector data comprises:

applying a machine learning model trained to extract three-dimensional building features from the accessed geospatial imagery.

10. The system of claim 6, wherein the three-dimensional landcover feature comprises forest canopy.

11. At least one non-transitory machine-readable storage medium comprising instructions that when executed cause one or more processors to:

access geospatial imagery covering an area of interest, wherein the area of interest includes one or more building features and one or more above-ground natural landcover features;

generate, from the geospatial imagery, a digital surface model over the area of interest, wherein the digital surface model includes one or more above-ground points corresponding to the one or more building features and the one or more above-ground natural landcover features;

extract, from the geospatial imagery, first two-dimensional vector data that represents one or more boundaries of the one or more building features, and second two-dimensional vector data that represents one or more boundaries of the one or more above-ground natural landcover features;

generate a preliminary digital terrain model over the area of interest, wherein generating the preliminary digital terrain model involves removing from the digital surface model portions of the digital surface model that represent above-ground points bound by the first and second two-dimensional vector data;

generate first three-dimensional vector data that represents the one or more building features, wherein the first three-dimensional vector data includes one or more ground-level points at one or more bases of the one or more building features;

generate a refined digital terrain model over the area of interest, wherein generating the refined digital terrain model involves inserting the one or more ground-level points of the first three-dimensional vector data into the preliminary digital terrain model and filling the preliminary digital terrain model between the one or more ground-level points with one or more estimated ground-level points;

generate second three-dimensional vector data that represents the one or more above-ground natural landcover features based on the second two-dimensional vector data and the above-ground points bound by the second two-dimensional vector data; and combine the refined digital terrain model with the first three-dimensional vector data and the second three-dimensional vector data to produce a structural digital surface model.

12. The at least one non-transitory machine-readable storage medium of claim 11, wherein:

generating the second three-dimensional vector data involves deriving a height attribute for an above-ground natural landcover feature from one or more raw data points of the digital surface model located within the area bound by the second two-dimensional vector data.

13. The at least one non-transitory machine-readable storage medium of claim 11, wherein:

filling the preliminary digital terrain model between the one or more ground-level points with one or more estimated ground-level points involves using a non-linear optimization process in which the one or more ground-level points of the first three-dimensional vector data are used a seed in the non-linear optimization process.

14. The at least one non-transitory machine-readable storage medium of claim 11, wherein generating the first three-dimensional vector data comprises:

applying a machine learning model trained to extract three-dimensional building features from the accessed geospatial imagery.

15. The at least one non-transitory machine-readable storage medium of claim 11, wherein the three-dimensional landcover feature comprises forest canopy.

* * * * *